Feb. 21, 1967 　　　L. F. KOPICH　　　3,305,253
ROD ADJUSTMENT CLAMPING DEVICE
Filed Nov. 24, 1964

INVENTOR.
Leonard F. Kopich
BY
Paul Fitzpatrick
ATTORNEY

United States Patent Office 3,305,253
Patented Feb. 21, 1967

3,305,253
ROD ADJUSTMENT CLAMPING DEVICE
Leonard F. Kopich, Madison Heights, Mich., assignor to General Motors Corporation, Detroit, Mich., a corporation of Delaware
Filed Nov. 24, 1964, Ser. No. 413,525
2 Claims. (Cl. 287—58)

The subject invention relates to a fastening means and, more particularly, it relates to a clamping device for securing two parallel rods together.

There are many situations where it is desirable to secure two rods together with their longitudinal sections abutting each other. It is also desirable in such situations to be able to adjust the relative positions of each of the rods. An example of such a situation is the carburetor linkage in an automobile engine where it is frequently desirable to change the position of the parallel rods so that their combined length can be adjusted to conform to various requirements.

It is therefore an object of the subject invention to provide a simple securement means for connecting two parallel rods which is adapted to allow for adjustment in the relative positions of the rods.

In general, the subject connector comprises a bracket through which the parallel rods are passed and which contains an adjustable wedge that can be forced against the rods to secure them within the bracket. A screw means is provided to adjust the position of the wedge in order to secure or release the rods.

Other objects, features and advantages of the subject invention will become obvious upon reference to the attached sheet of drawings, wherein.

Figure 1:
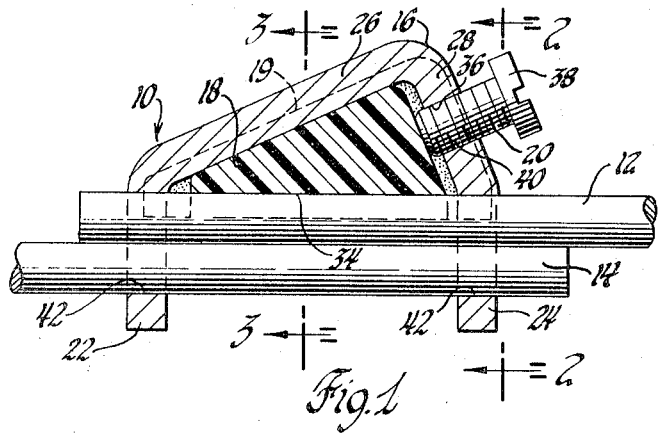
FIGURE 1 is a sectional view of the subject connector holding two parallel rods.
Figure 2:
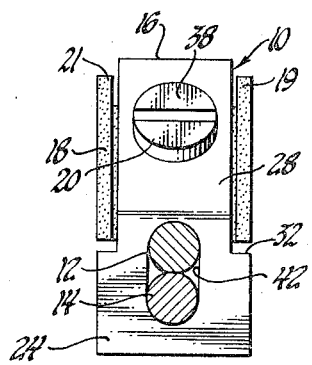
FIGURE 2 is an end view taken in the direction of arrows 2—2 in FIGURE 1.
Figure 3:
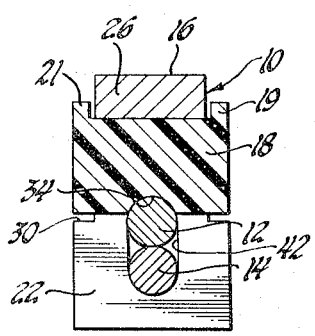
FIGURE 3 is a sectional view taken in the direction of arrows 3—3 in FIGURE 1.
Figure 4:
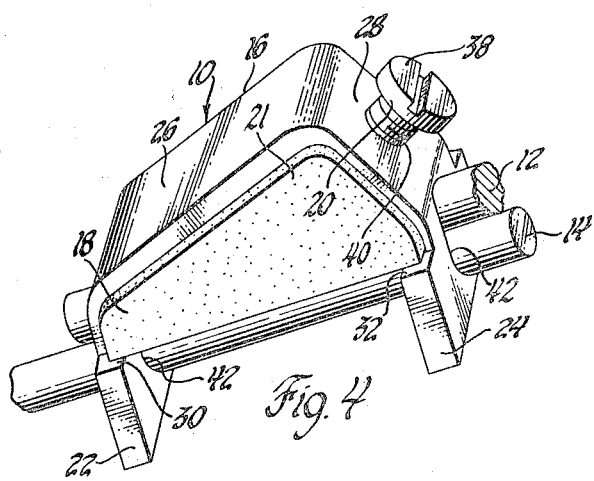
FIGURE 4 is a perspective view of the subject clamping device.

Specifically, FIGURE 1 is a sectional view of the subject clamping device 10 securing a pair of parallel rods 12 and 14. The clamping device 10 is seen to include a bracket 16, a wedge portion 18, and a threaded adjustment member 20. As best seen in FIGURE 4, the bracket 16 is comprised of two parallel sides 22 and 24 connected on one end only by portions 26 and 28 which are at an angle with each other and with the parallel sides 22 and 24. The parallel sides 22 and 24 are seen to be somewhat wider than the angled connecting portions 26 and 28 thereby providing retaining surfaces 30 and 32 for the wedge 18. The wedge 18 has two edges which conform to the shape of the angled connecting portions 26 and 28 of the bracket 16 and has a rod engaging groove 34 in its lower surface. The wedge 18 also is seen to have ear portions 19 and 21 which extend adjacent to the portions 26 and 28 of the bracket 16 to hold the wedge 18 within the bracket 16. The angled connecting portion 28 of the bracket 16 has a threaded bore 36 therethrough which receives the threaded member 20. The threaded member 20 may be of any suitable type having a head portion 38 adapted to be rotated by a suitable tool (not shown) and a threaded shank portion 40 adapted to engage the threaded bore 36 of the bracket 16 so that the member 20 can be adjusted in and out of the bracket 16. It is further to be noted that the parallel sides 22 and 24 of the bracket 16 have identical aligned passages 42 formed therethrough to receive the rods 12 and 14.

The assembly of the subject clamping device is relatively simple and may be characterized by the following description. First of all, the bracket 16 is bent over the wedge 18 thereby forming the portions 26 and 28 of the bracket and securing the wedge 18 within the bracket by means of ear portions 19 and 21 which rest on retaining surfaces 30 and 32 of the parallel sides 22 and 24 and extend adjacent to portions 26 and 28. The wedge 18 is positioned within the bracket 16 so that its rod engaging groove 34 is aligned with the rod receiving passages 42 in the sides 22 and 24. Next, the parallel rods 12 and 14 are inserted through the rod receiving passages 42 in the parallel sides 22 and 24 so that the rod 12 slides within the rod engaging groove 34 of the wedge 18. The parallel rods 12 and 14 are then longitudinally adjusted to their desired position, and finally the threaded member 20 is threaded through the bore 36 and the bracket 16 so that it engages the wedge 18 thereby forcing the wedge 18 against the rod 12 thereby securing rods 12 and 14 within the bracket 16. It is suggested that the wedge 18 be of a material such as nylon to provide strong retention forces on the rods 12 and 14.

Figure 5:
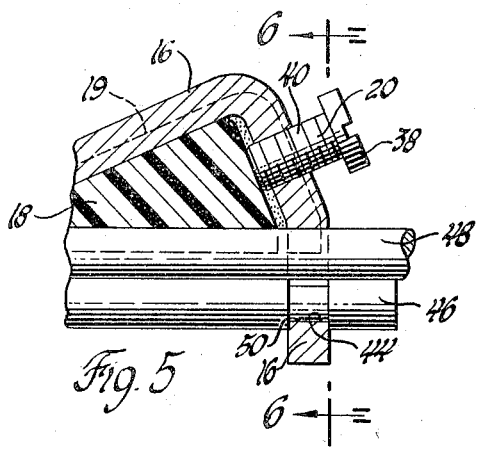
FIGURE 5 is a partial sectional view showing an alternate embodiment of the subject invention.
Figure 6:
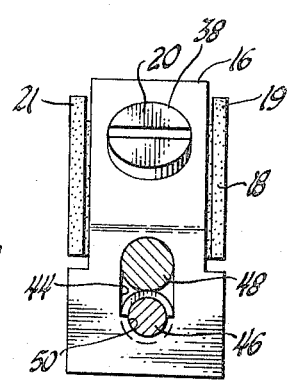
FIGURE 6 is an end view taken in the direction of arrows 6—6 in FIGURE 5.

An alternate embodiment of the subject invention is shown in FIGURES 5 and 6. The details of the clamping device are identical with the exception that the rod engaging passage 44 in the bracket 16 is slightly shorter than its counterpart 42 in the previously described embodiment. In addition, the lower of the two parallel rods 46 and 48 has an annular groove 50 formed therein which engages the surface of the passage 44 in the bracket 16 to index the rod 46 and prevent its movement with respect to the bracket 16. The depth of the groove 50 compensates for the decreasing size of the rod engaging passage 44. This embodiment enables the mechanic to index one rod, and then with one hand adjust the position of the other rod and tighten the threaded engagement member 20 to thereby secure the rods within the bracket. The only difference in the assembly of this embodiment from the previously described embodiment is that the lower rod 46 must be inserted first so that its annular groove 50 is indexed on the rod engaging passage 44 in bracket 16. The other rod 48 may then be inserted and the adjustment member 20 tightened to secure the rods within the clamping device. The remaining details of this alternate embodiment are identical with those of the previously described embodiment shown in FIGURES 1 through 4.

Thus it can be seen that a clamping device for securing two parallel rods together and yet allowing for the adjustment of their relative positions is provided which is relatively simple in structure and yet extremely effective.

Although but two specific embodiments of the subject invention have been described and shown in detail, it should be clear to those skilled in the art to which the invention pertains, that many changes and modifications may be made thereto without departing from the scope of the invention.

I claim:
1. A clamping device for parallel rods comprising:
a bracket having a pair of generally parallel sides connected at one end by two portions at an angle with each other and with said parallel sides, said bracket having an open bottom and open lateral sides, said parallel sides each having rod receiving passage therethrough and a widened portion forming retaining surfaces on either side of said angle portions, one of said angled connecting portions having a threaded bore therethrough;
a wedge means positioned within said bracket for limited vertical movement between said two angled connecting portions and said retaining surfaces on said parallel sides, said wedge being wider than said angled portions and having ears which straddle said angled portions to fix said wedge laterally with respect to said bracket;

and a threaded means received in said threaded bore and adjustable to transmit force to said wedge whereby said clamping device is adapted to adjustably secure a pair of rods together.

2. A clamping device for parallel rods comprising:

a bracket having a pair of generally parallel sides connected at one end by two portions at an angle with each other and with said parallel sides, said bracket having an open bottom and open lateral sides, said parallel sides each having aligned passages adapted to receive a pair of axially abutting rods therethrough and a widened portion forming retaining surfaces on each side of said angled portions, one of said angled connecting portions having a threaded bore therethrough and the other of said angled connecting portions providing a ramp surface;

a wedge having two sides conforming with said angled connecting portions of said bracket and a third side adapted to engage said retaining surfaces and with a rod engaging groove formed therein, said wedge being wider than said angled portions and having ears adapted to straddle said angled portion when said wedge is positioned within said bracket between said angled connecting portions and said retaining surfaces whereby said wedge has limited lateral and vertical movement;

and a screw received in said threaded bore in one of said angled connecting portions and adjustable to engage said wedge and slide it along said ramp surface provided by the other of said angled connecting portions to force said rod engaging groove of said wedge against said rods thereby securing the rods within said bracket.

References Cited by the Examiner

UNITED STATES PATENTS

| | | |
|---|---|---|
| 797,943 | 8/1905 | Crawford. |
| 2,032,394 | 3/1936 | Becker et al. _____ 287—78 X |
| 2,132,967 | 10/1938 | Pennell _____ 287—78 X |
| 2,337,805 | 12/1943 | Erickson. |

CARL W. TOMLIN, *Primary Examiner.*

THOMAS F. CALLAGHAN, *Examiner.*